Dec. 30, 1969 A. H. LOZANO ET AL 3,486,544
HIGH-SPEED NUT AND LOCKWASHER
Filed June 21, 1968 2 Sheets-Sheet 1

INVENTOR.
EDWARD KOTTSIEPER
BY ANTHONY H. LOZANO

Lynn H Latta
-ATTORNEY-

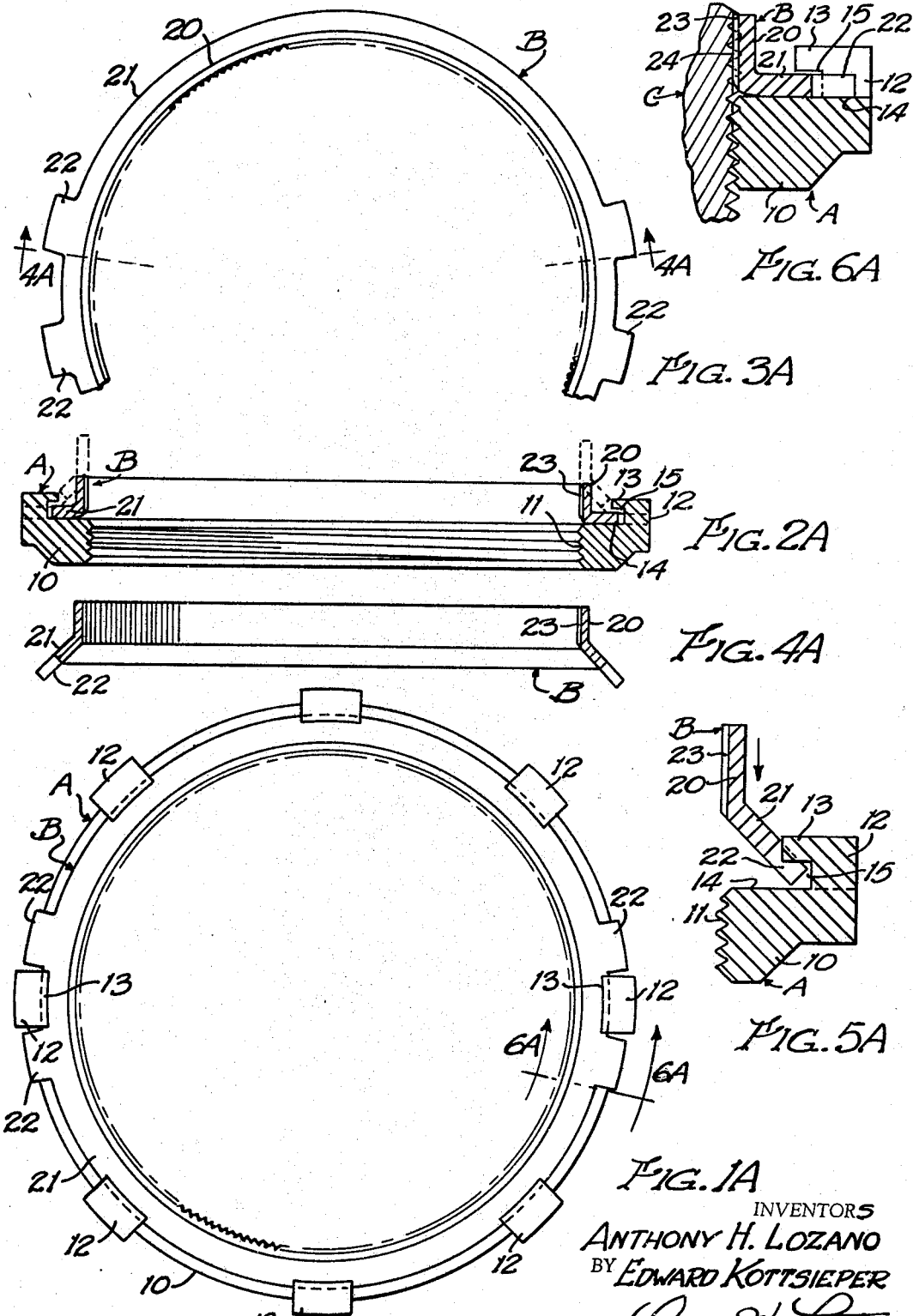

United States Patent Office 3,486,544
Patented Dec. 30, 1969

3,486,544
HIGH-SPEED NUT AND LOCKWASHER
Anthony H. Lozano, Westminster, Calif., and Edward Kottsieper, Fairfield, Conn., assignors to Shur Lok Corporation, Santa Ana, Calif., a corporation of California
Filed June 21, 1968, Ser. No. 738,928
Int. Cl. F16b 39/00
U.S. Cl. 151—29    6 Claims

ABSTRACT OF THE DISCLOSURE

A nut having retaining means internally receiving a lockwasher and retaining it against axial separation from the nut, the washer being locked against rotation on a male thread by means of a splined connection thereto, and the nut being locked to the washer by tangs on the washer interlocked with abutment means on the nut and preventing relative rotation between the two.

Background of the invention

A lockwasher having external tangs which snap over the periphery of a nut and lock the nut to the washer, which in turn is splined onto the male threads of the member onto which the nut is threaded, is in common use for precision bearing retention. One disadvantage is that the tangs must be extended to clear the nut. This requires a considerable deflection on a small area. Another disadvantage is that the method of retention, the tangs, is not positive. A third disadvantage is that, in order to obtain the spring temper required, the lockwasher must be heat treated. This limits the materials which may be used due to distortion and growth problems inherent in heat treating certain materials. Such a lockwasher and nut assembly is disclosed in Kottsieper Patent No. 3,002,-809, issued Feb. 27, 1962.

Summary of the invention

This invention provides a lockwasher having on its periphery, radially projecting means adapted, by radial expansion into internal retaining means in the end of a nut, while the washer is assembled to the nut by forcing it axially into spined connection with a male threaded member, to couple the washer to the nut so as to retain them against axial separation. Radial tangs on the washer interlock with radial abutments on the nut to lock the nut and washer together against relative rotation. Thus the washer, splined to the male member, holds the nut against unthreading from the male member.

Objects of the invention (a) To provide a combination nut and lockwasher which may be used at high rotational speeds well beyond the limits of existing rotating assemblies utilizing bearings;

(b) To provide an assembly which is not limited as to materials due to distortion and growth problems inherent in heat-treating certain materials;

(c) To provide a lockwasher that can be removed and reused numerous times without affecting its retention characteristics.

In the drawings:

Two configurations incorporating features of this invention are shown in the drawings:

FIG. 1A is a plan view of a nut and washer assembly embodying a modified form of the invention;

FIG. 2A is a diametral sectional view of the same;

FIG. 3A is a fragmentary plan view of the washer of FIG. 1A, before installation;

FIG. 4A is a diametral sectional view of the same, taken on line 4A—4A of FIG. 3A;

FIG. 5A is an enlarged radial sectional view of the parts juxtaposed for coupling;

FIG. 6A is an enlarged sectional view of the assembly, taken on line 6A—6A, of FIG. 1A, the line of sight following the circumferential curvature of the assembly in order to more clearly display the relationship of parts.

Description of the invention

Figure 2:
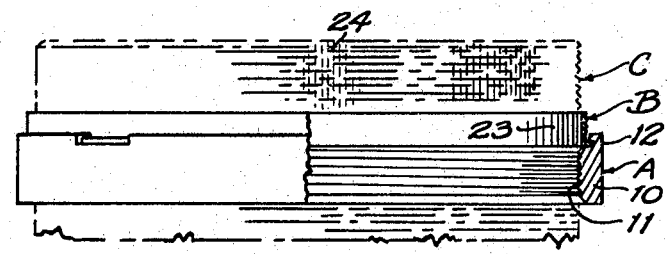
FIG. 2 is a front view of the same with one side shown in elevation and the other in section, the nut and washer being installed on a male threaded member shown in phantom.

Referring now to FIGS. 1–7 of the drawings, we have shown therein, as an example of one form in which the invention may be embodied, a combination nut A and lockwasher B adapted to be installed on a male threaded member C (FIG. 2).

Nut A has a body ring 10 provided with female threads 11. On the end of the nut, formed as an extension of its periphery, is a rim comprising a cylindrical skirt 12 which has an inwardly projecting lip 13, spaced axially from a radial end shoulder 14 to define an annular internal groove 15 encircled by skirt 12. The inner surface of lip 13 is frusto-conical, so as to constitute a ramp 16.

In the rim of the nut are a plurality of notches 17 positioned to receive anti-rotation lugs on the washer B, as hereinafter described. The notches 17 extend the full depth of shoulder 14, which defines the bottoms of the notches.

Washer B comprises a body 20 in the form of a cylindrical collar, a base flange 21 projecting radially outwardly from one end of the collar, and a plurality of circumferentially-spaced rotation-restraining lugs 22 formed as radial extensions of base flange 21.

Lugs 22 are positioned for reception in corresponding notches 17 of nut A, to lock the nut to the washer to prevent relative rotation. Thus, with the washer locked to the male member C against turning thereon, by the splined connection 23, 24, the nut is effectively locked against rotation on member C.

Washer flange 21 has an outer diameter slightly larger than the minimum diameter of lip 13 (at the bottom of ramp 16). Upon installation, the outer edge of flange 21 slides down the ramp 16 in response to axial pressure which is applied to the washer, the flange 21 exerting a wedging action which causes it to clear the inward extremity of the ramp and expand into the retainer groove 15. The radial section of the washer is of such thickness as to allow a slight inward deflection which, added to a slight outward flexing of the segments of the nut rim, provides sufficient yield for the flange 21 to clear the ramp segments. Internally, collar 20 has a plurality of splines 23 to mate with spline notches 24 in the threads of male member C in a manner to permit installation of the washer by passing it axially over the male threads. The collar 20 is externally threaded, at 25, for coupling a removing tool thereto when it is necessary to remove the washer and nut from the male threaded member.

The nut and washer combination described above has the following advantages:

(a) The combination nut and lockwasher may be used at high rotational speeds well beyond the limits of existing rotating assemblies utilizing bearings.

(b) The assembly is not limited as to materials due to distortion and growth problems inherent in heat treating certain materials.

(c) The lockwasher may be removed and reused numerous times without affecting its retention characteristics.

Modified form of the invention

Figure 5:
FIG. 5 is a fragmentary plan view of the washer.
Figure 4:
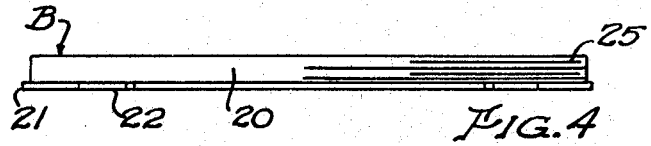
FIG. 4 is a front view of the washer.
Figure 3:
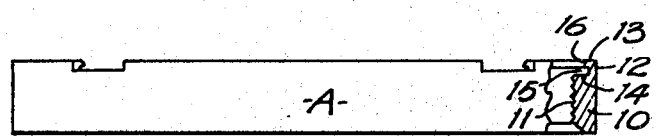
FIG. 3 is a front view of the nut, with one side shown in elevation and the other in section.
Figure 7:
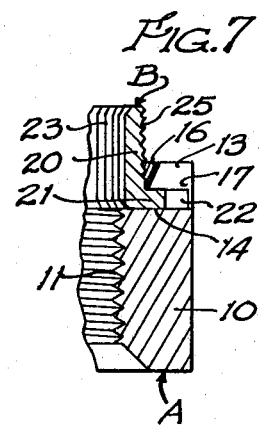
FIG. 7 is an enlarged, detail sectional view of the nut and washer assembly taken on line 7—7 of FIG. 1.
Figure 6:
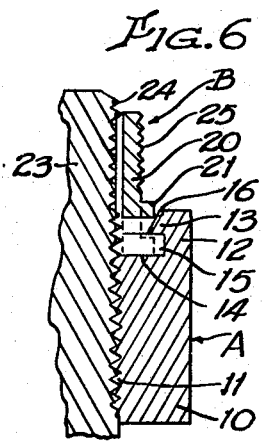
FIG. 6 is an enlarged, detail sectional view of the washer and nut, juxtaposed for coupling.
Figure 1:
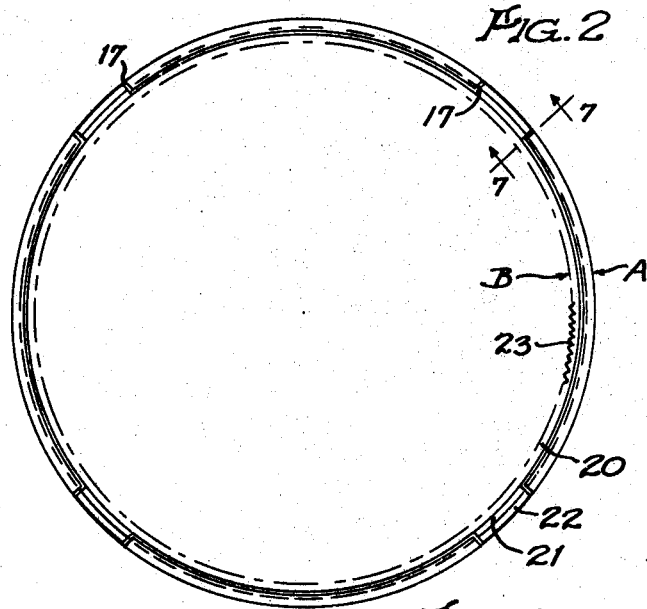
FIG. 1 is a plan view of a lockwasher and nut assembly embodying one form of the invention.

In FIGS. 1A–6A we have shown a modified form of the invention in which washer B has its base flange 21 initially formed with a conical flare, as best shown in FIG. 4A, and in which the flange 21 is expanded into the segmental annular groove 15 collectively defined by notches in the inner sides of a plurality of retainer lugs 12 with overhanging lips 13 projecting axially from the end shoulder 14 of nut A. Anti-rotation lugs 22 of washer B are arranged in two or more pairs (two are shown) each adapted to bracket a respective retainer lug 12 of nut A (FIG. 1A). In its initial form, flange 21 is slightly smaller in diameter than the diameter between the inner extremities of the retainer lips 13 (FIG. 5A) so that the flange may freely clear the lips as the washer is driven onto male member C. As the anti-rotation lugs 22 and then the flange 21 successively are driven against the shoulder 14, they will be deflected outwardly and the flange 21 will be expanded and deformed until the flange is seated on the shoulder 14 with its periphery retained beneath lips 13 (FIG. 2A) and with the lugs 22 in bracketing relation to a pair of diametrically-opposed retainer lugs 12. The washer B of FIGS. 1A–6A is fabricated of sufficiently soft, deformable metal to retain the deformed cross-section approximately as shown in FIGS. 2A and 6A.

We claim:

1. A nut and lockwasher combination for attachment to a member having male threads provided with spline notches, comprising:

a nut having an internally threaded body and an end shoulder and segmental retainer members projecting axially from said shoulder, said members each embodying an axially projecting portion and a radially inwardly projecting retainer lip axially spaced from said shoulder to define a segmental internal retainer recess;

and a washer including an internally splined cylindrical collar adapted to be installed axially over said male threads and into splined rotation-preventing coupling therewith, an annular retainer flange on one end of said collar, projecting outwardly of the periphery of said collar, said flange having a normal diameter slightly larger than the diameter of spacing between opposed retainer lips, and said retainer lips having inner faces inclined with reference to the major axis thereof so as to provide ramps against which said flange may exert a wedging action, said retainer members and said washer being relatively yieldable radially with a resilient action in response to said wedging action such as to permit said flange to pass said lips and enter said recesses with a snap-in action, whereby to prevent axial separation of said washer and nut, and anti-rotation lugs projecting outwardly beyond the periphery of said retainer flange and engageable with said segmental retainer members to provide a rotation-restraining interlock between said washer and nut such as lock said nut against rotation on said male threads, said segmental retainer members being circumferentially separated by retainer notches to receive said lugs to establish said rotation-restraining interlock, said notches being axially open in the end of the nut so as to freely receive said anti-rotation lugs with relative axial movement during said snap-in entry of said retainer flange into said recesses.

2. The combination defined in claim 1, wherein said washer is slightly yieldable inwardly and said retainer members are slightly yieldable outwardly to provide an aggregate yieldability sufficient for said flange to clear said lips in response to axial pressure applied to said washer.

3. The combination defined in claim 1, wherein said anti-rotation lugs are formed as radially outward extensions of said flange.

4. The combination defined in claim 1, wherein said retainer notches are of width just sufficient to freely receive said anti-rotation lugs to provide said rotation-restraining engagement between the washer and the nut.

5. The combination defined in claim 1, wherein
    said segmental retainer members are of narrow lug form and wherein
    said anti-rotation lugs are disposed in at least one pair spaced for bracketing association with a respective retainer lug.

6. The combination defined in claim 1, wherein
    said segmental retainer members are of narrow lug form and wherein
    said anti-rotation lugs consist of diametrically opposite pairs spaced for bracketing association with respective retainer lugs.

References Cited

UNITED STATES PATENTS

| 1,755,807 | 4/1930 | Boles | 151—28 |
| 3,253,630 | 5/1966 | Phelan | 151—29 |

RAMON S. BRITTS, Primary Examiner

U.S. Cl. X.R.

151—8